(12) United States Patent
Su et al.

(10) Patent No.: US 12,014,892 B2
(45) Date of Patent: Jun. 18, 2024

(54) FUSE MOUNTING STRUCTURE AND BATTERY SYSTEM

(71) Applicant: Sungrow Energy Storage Technology Co., Ltd., Hefei (CN)

(72) Inventors: Jinguo Su, Anhui (CN); Feng Pan, Hefei (CN); Junjie Mao, Hefei (CN)

(73) Assignee: Sungrow Energy Storage Technology Co., Ltd., Hefei (CN)

( * ) Notice: Subject to any disclaimer, the term of this patent is extended or adjusted under 35 U.S.C. 154(b) by 0 days.

(21) Appl. No.: 18/095,868

(22) Filed: Jan. 11, 2023

(65) Prior Publication Data
US 2023/0238203 A1 Jul. 27, 2023

(30) Foreign Application Priority Data
Jan. 24, 2022 (CN) .......................... 202220193512.4

(51) Int. Cl.
*H01H 85/22* (2006.01)
*H01H 85/20* (2006.01)
*H01M 50/583* (2021.01)

(52) U.S. Cl.
CPC ............ *H01H 85/20* (2013.01); *H01H 85/22* (2013.01); *H01M 50/583* (2021.01); *H01M 2200/103* (2013.01)

(58) Field of Classification Search
CPC ................... H01H 85/20; H01H 85/22; H01H 2085/207–2085; H01M 50/583; H01M 2200/103
See application file for complete search history.

(56) References Cited

U.S. PATENT DOCUMENTS

| 4,555,451 | A | * | 11/1985 | Harrod | ................ H01M 50/581 |
| | | | | | 429/61 |
| 5,580,281 | A | | 12/1996 | Takeuchi | |
| 2002/0134572 | A1 | * | 9/2002 | Matsumura | .......... H01H 85/044 |
| | | | | | 174/66 |
| 2004/0175991 | A1 | * | 9/2004 | Cheng | .................... H01R 11/24 |
| | | | | | 439/620.33 |

(Continued)

FOREIGN PATENT DOCUMENTS

| CN | 107170656 B | 10/2018 |
| JP | 2002-358868 A | 12/2002 |

OTHER PUBLICATIONS

Extended European Search Report for European Application No. 23151209.6, dated May 24, 2023.

*Primary Examiner* — Jacob R Crum
(74) *Attorney, Agent, or Firm* — Wolf, Greenfield & Sacks, P.C.

(57) ABSTRACT

A fuse mounting structure and a batter system are provided according to the present application, the fuse mounting structure is used for mounting a fuse to a battery box, and includes a drawer and a fuse base; where the fuse base is mounted in the battery box, and the drawer is used for mounting the fuse; the drawer is provided with a guide device in a sliding fit with the fuse base, so as to guide the drawer to be inserted into the fuse base. According to the fuse mounting structure, the guide device is arranged on the drawer, the guide device guides the drawer with fuse when the drawer enters the fuse base, there is no need to align the plug-in holes, which realizes blind insertion of fuses and reduces the workload of fuse insertion.

10 Claims, 7 Drawing Sheets

(56) References Cited

U.S. PATENT DOCUMENTS

| | | | |
|---|---|---|---|
| 2008/0184560 A1* | 8/2008 | Pizzi | H01H 85/56 29/874 |
| 2015/0042442 A1 | 2/2015 | Garascia et al. | |
| 2015/0207130 A1* | 7/2015 | Maguire | B60L 58/21 429/97 |

* cited by examiner

FUSE MOUNTING STRUCTURE AND BATTERY SYSTEM

CROSS REFERENCE TO RELATED APPLICATIONS

This application claims the priority to Chinese Patent Application No. 202220193512.4 titled "FUSE MOUNTING STRUCTURE AND BATTERY SYSTEM", filed with the China National Intellectual Property Administration on Jan. 24, 2022, which is incorporated herein by reference in its entirety.

FIELD

The present application relates to the technical field of battery system, and in particular to a fuse mounting structure and a battery system.

BACKGROUND

The requirement of overcurrent (short circuit) protection of battery is usually realized by fuse. However, when the fuse is to be disassembled, the battery cover needs to be removed to replace the fuse, which requires long working hours and heavy workload. If there are other components in the upper part of the battery box, it is necessary to remove the battery box or the components, and there is a risk that the sealing strip of the upper cover may be damaged during the installation and removal of the upper cover, which may weaken the protective performance of the battery box.

To solve the above problems, at present, a maintenance window is usually provided on the battery box, and the fuse is replaced by removing the cover plate for fuse maintenance. However, this method requires the fuse to be aligned with the plug-in hole for insertion, which is time-consuming and laborious.

SUMMARY

In view of this, a first object according to the present application is to provide a fuse mounting structure, to reduce the workload of fuse insertion.

A second object of the present application is to provide a battery system.

In order to achieve the first object, the following technical solutions are provided according to the present application.

A fuse mounting structure for mounting a fuse to a battery box, including a drawer and a fuse base; where the fuse base is mounted in the battery box, and the drawer is used for mounting the fuse; the drawer is provided with a guide device in a sliding fit with the fuse base, so as to guide the drawer to be inserted into the fuse base.

In a specific embodiment, the guide device includes side wall guide members, a top guide portion and/or a bottom guide portion;

the side wall guide members are arranged on both sides of the drawer, respectively, and are in a sliding fit with base side walls located on both sides of the fuse base;

the top guide portion is arranged at a top of the drawer and is configured to be in a sliding fit with a base top wall of the fuse base;

the bottom guide portion is arranged at a bottom of the drawer and is configured to be in a sliding fit with a base bottom wall of the fuse base; and along a direction of the drawer entering the fuse base, a distance between the base side walls located on both sides of the fuse base is gradually reduced, and a distance from the base top wall to the base bottom wall of the fuse base is gradually reduced.

In another specific embodiment, the drawer includes a bottom plate for supporting a bottom end of the fuse; and support plates respectively arranged at both sides of the bottom plate, the support plate is provided with a hanging groove for supporting an electrical connection portion located at each of both sides of the fuse, and an electrical connection groove, configured for wiring, of the electrical connection portion is located outside the hanging groove.

In another specific embodiment, the drawer further includes a blocking plate, the blocking plate is connected with the support plate and covers the fuse.

In another specific embodiment, the blocking plate and the support plate are connected by bolts, adhesive bonding, pouring sealant or buckles.

In another specific embodiment, the drawer further includes a finger pressing plate, the finger pressing plate is arranged between the support plates, and is located at an end of the support plate away from the hanging groove; or, the drawer further includes a pull ring which is arranged between the support plates and allows fingers to extend in, and the pull ring is located at an end of the support plate away from the hanging groove.

In another specific embodiment, the finger pressing plate is provided with an anti-slip protrusion and/or an anti-slip groove and/or an anti-slip through hole; and/or, a surface of the bottom plate used for supporting the fuse is provided with a heat dissipation protrusion and/or a heat dissipation groove and/or a heat dissipation through hole.

In another specific embodiment, a distance between at least one of the base bottom wall and the base top wall of the fuse base and a maintenance panel of the battery box is smaller than a preset gap.

In another specific embodiment, one of the fuse base and the drawer is provided with a plug-in hole, and the other one of the fuse base and the drawer is provided with a plug-in protrusion which is inserted and matches the plug-in hole.

In another specific embodiment, along a direction of entering the plug-in hole, a bottom end face of the plug-in protrusion is arranged to be inclined toward a top end face thereof.

The various embodiments according to the present application can be combined arbitrarily as required, and the embodiments obtained after these combinations are also within the scope of the present application and are a part of the specific embodiments of the present application.

According to the fuse mounting structure provided by the present application, the guide device is arranged on the drawer, the guide device guides the drawer mounted with fuse when the drawer enters the fuse base, there is no need to align the plug-in holes, which realizes blind insertion of fuses, and thereby reducing the workload of fuse insertion.

In order to achieve the second object, the following technical solutions are provided according to the present application.

A battery system, including a battery box and a fuse mounting structure as described in any one of the above solutions, where the fuse mounting structure is mounted in the battery box.

As the battery system provided by the present application includes the fuse mounting structure of any one of the above solutions, the beneficial effects of the fuse mounting structure are included in the battery system disclosed by the present application.

BRIEF DESCRIPTION OF THE DRAWINGS

For more clearly illustrating the technical solutions in the embodiments of the present application or the conventional technology, drawings referred to for describing the embodiments or the conventional technology will be briefly described hereinafter. Apparently, drawings in the following description are only some examples of the present application, and for the person skilled in the art, other drawings may be obtained based on the provided drawings without any creative efforts.

Figure 1:
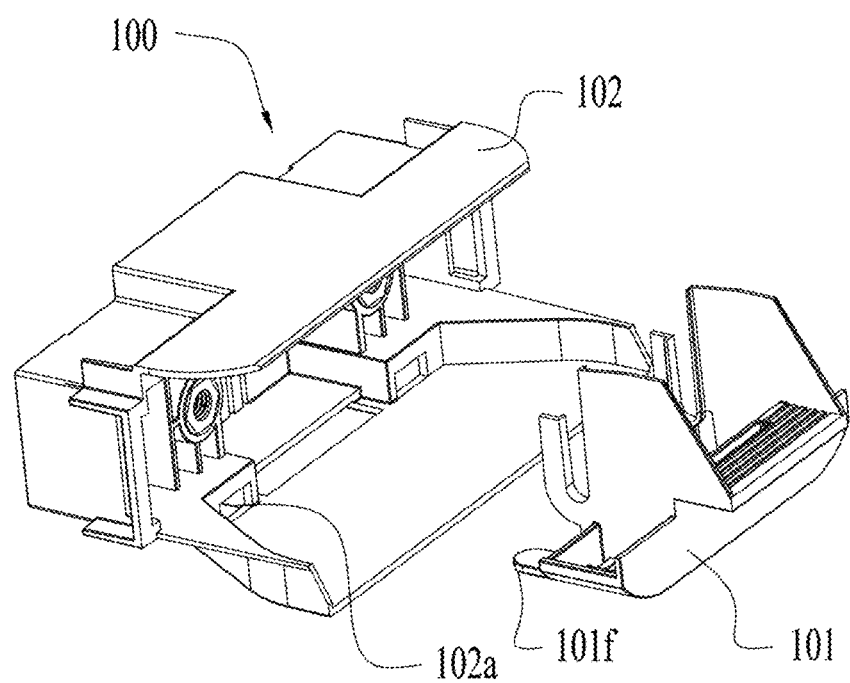
FIG. 1 is an exploded schematic view showing a fuse mounting structure according to the present application.

Reference numerals in FIGS. 1 to 10:

| 100 | fuse mounting structure, | 101 | drawer, |
|---|---|---|---|
| 101a | bottom plate, | 101a-1 | heat dissipation protrusion, |
| 101b | support plate, | 101c | hanging groove, |
| 101d | blocking plate, | 101e | finger pressing plate, |
| 101e-1 | anti-slip protrusion, | 101f | plug-in protrusion, |
| 101g | pulling piece, | 102 | fuse base, |
| 102a | plug-in hole, | 102b | base top wall, |
| 102c | base bottom wall, | 102d | base side wall, |
| 103 | guide device, | 103a | side wall guide member, |
| 103b | top guide portion, | 103c | bottom guide portion, |
| 200 | fuse, | 201 | electrical connection portion, |
| 201a | the electrical connection groove, | | |
| 300 | battery box, | 301 | maintenance window. |

DETAILED DESCRIPTION OF THE EMBODIMENTS

The technical solutions in the embodiments of the present application will be described clearly and completely as follows in conjunction with the drawings in the embodiments of the present application. It is apparent that the described embodiments are only a part of the embodiments according to the present application, rather than all of the embodiments. Based on the embodiments of the present application, all other embodiments obtained by those having ordinary skill in the art without creative work shall fall within the protection scope of the present application.

In the description of the present application, it should be noted that the orientation or positional relationship indicated by the terms, such as "upper", "lower", "top surface", and "bottom surface", are based on the orientation or positional relationship shown in the drawings, which are only to facilitate the description of the present application and to simplify the description, rather than indicating or implying that the device or element referred to must have a specific orientation, or can only be configured and operated in a particular orientation. Therefore the above-mentioned terms should not be construed as a limitation to the present application. In addition, the terms "first", "second" and the like are for purpose of description, and should not be construed as indicating or implying relative importance.

Referring to FIG. 1 to FIG. 9, a fuse mounting structure 100 is provided according to a first aspect of the present application, which is made of an insulating material, and is used to mount a fuse 200 to a battery box 300.

Figure 2:
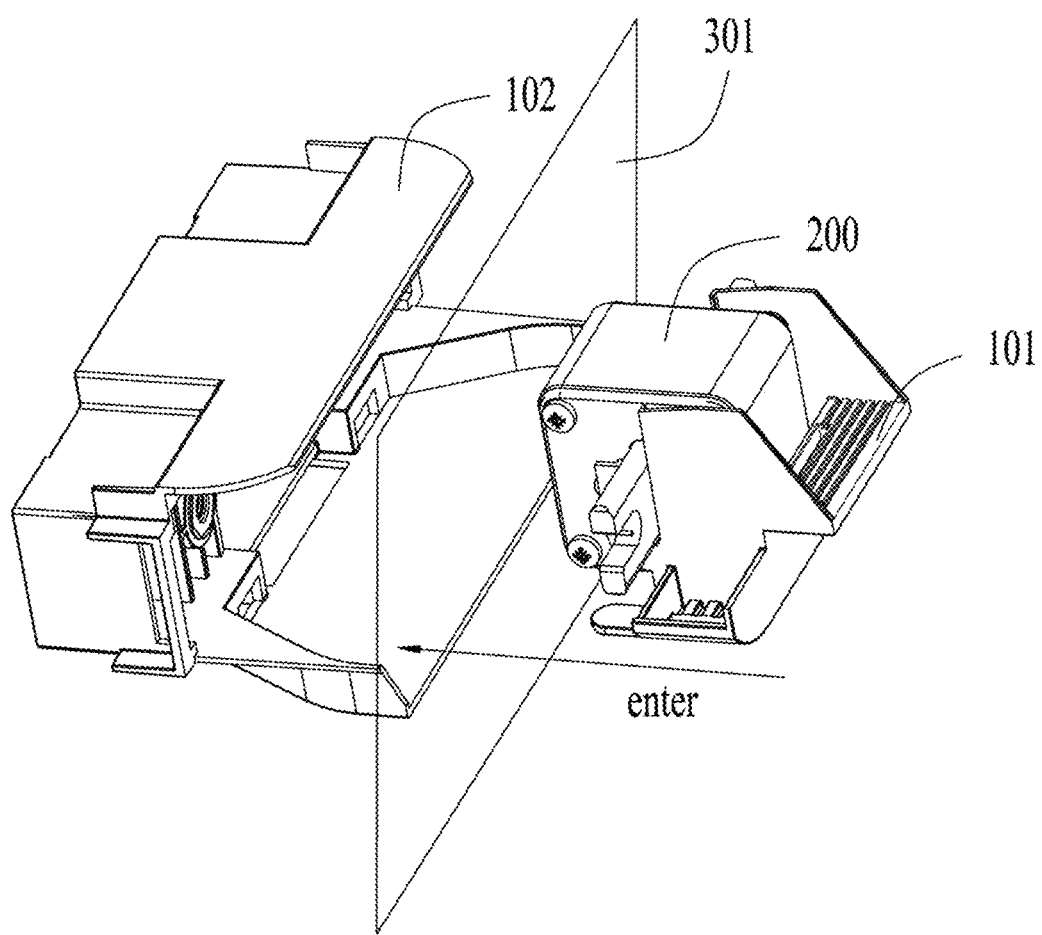
FIG. 2 is a structural schematic view showing a fuse being mounted in the fuse mounting structure according to the present application.
Figure 8:
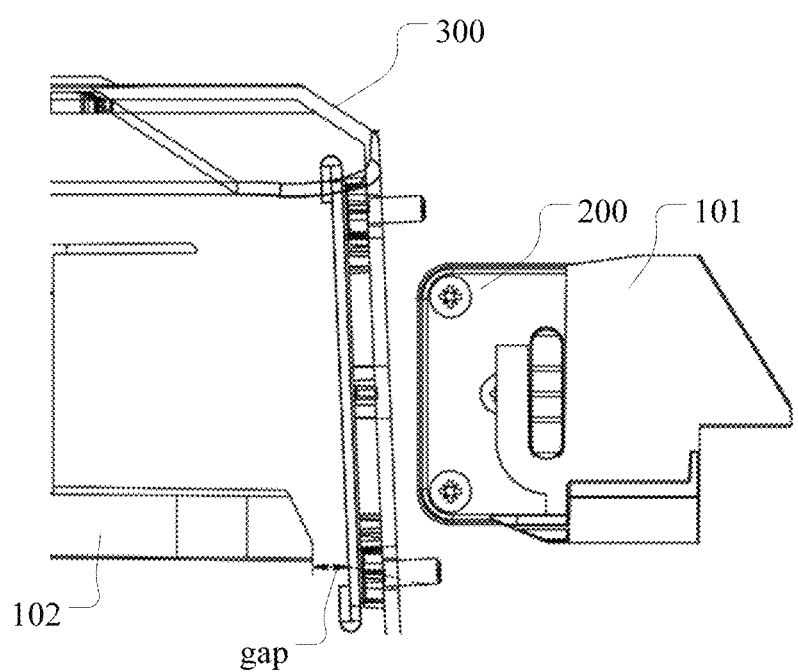
FIG. 8 is a front schematic view showing the fuse mounting structure according to the present application to be mounted in a battery box.
Figure 9:
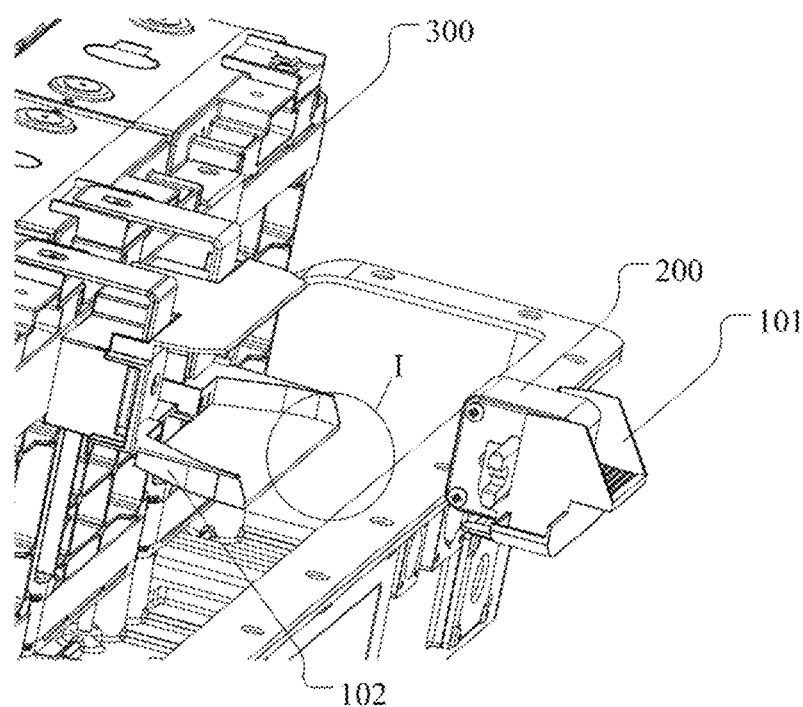
FIG. 9 is an isometric structural schematic view of FIG. 8.

Specifically, as shown in FIG. 1 and FIG. 2, the fuse mounting structure 100 includes a drawer 101 and a fuse base 102, the fuse base 102 is mounted in the battery box 300, specifically, the battery box 300 is provided with a maintenance window 301, the fuse base 102 is mounted into the battery box 300 through the maintenance window 301, as shown in FIG. 8 and FIG. 9.

The drawer 101 is used for mounting the fuse 200, it should be noted that the shape of the drawer 101 is not limited, as long as the drawer can hold and position the fuse 200, it belongs to the protection scope of the present application.

Figure 3:
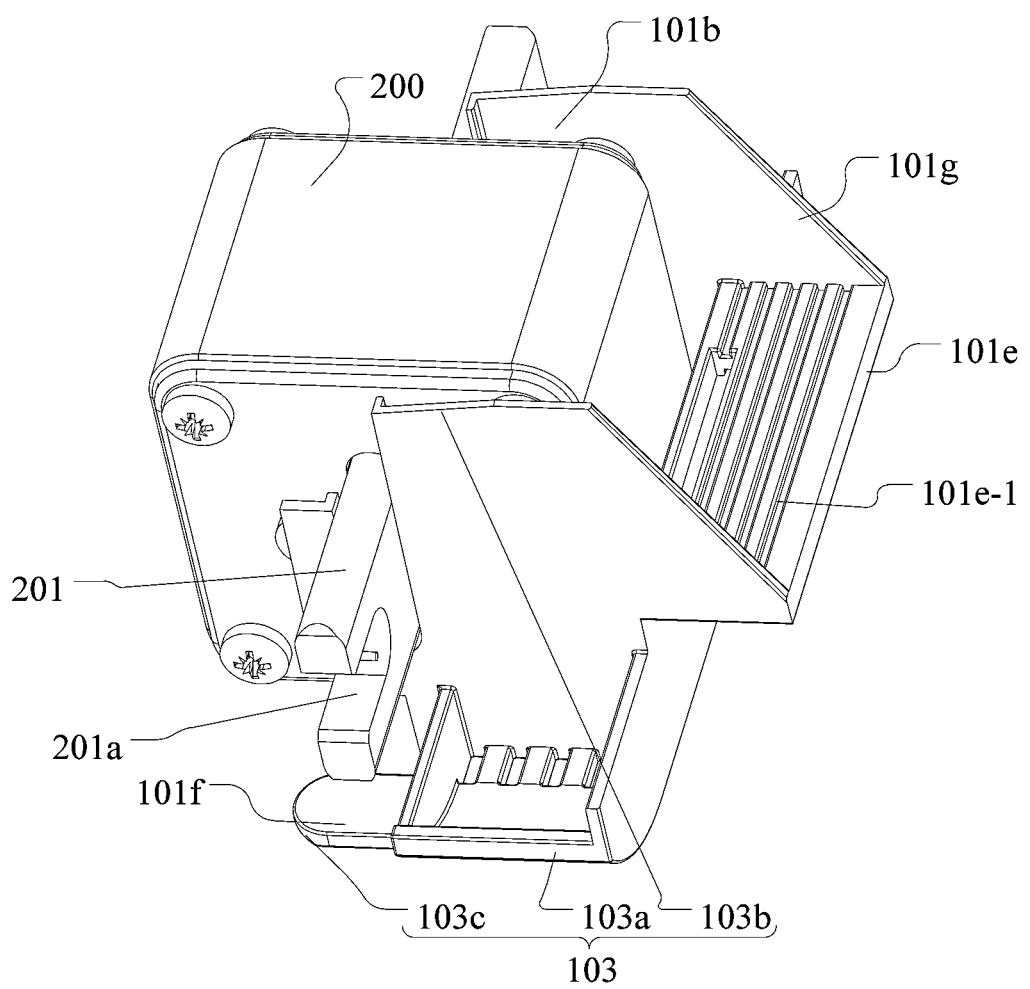
FIG. 3 is a structural schematic view showing the fuse being mounted on a drawer according to the present application.

As shown in FIG. 3, the drawer 101 is provided with a guide device 103 configured to be in a sliding fit with the fuse base 102, so as to guide the drawer 101 to be inserted into the fuse base 102.

In the fuse mounting structure 100 provided by the present application, the drawer 101 is provided with the guide device 103, the guide device 103 guides the drawer 101 with the fuse 200 when the drawer 101 enters the fuse base 102, there is no need to align the plug-in holes 102a, which realizes blind insertion of the fuse 200, and thereby reducing the workload of fuse 200 insertion.

In some embodiments, the guide device 103 includes side wall guide members 103a, a top guide portion 103b and/or a bottom guide portion 103c, the side wall guide members 103a are arranged on both sides of the drawer 101, respectively, and are in a sliding fit with base side walls 102d on both sides of the fuse base 102. In addition, along the direction that the drawer 101 enters the main body of the fuse 200, a distance between the base side walls 102d on both sides of the fuse base 102 is gradually reduced, which facilitates the left-right alignment of the drawer 101 when entering the fuse base 102.

Specifically, the side wall guide member 103a is an arc-shaped plate, and the surface, configured to be in sliding fit with the side wall guide member 103a, of the base side wall 102d, is an arc-shaped surface matching the shape of the side wall guide member 103a.

Figure 5:
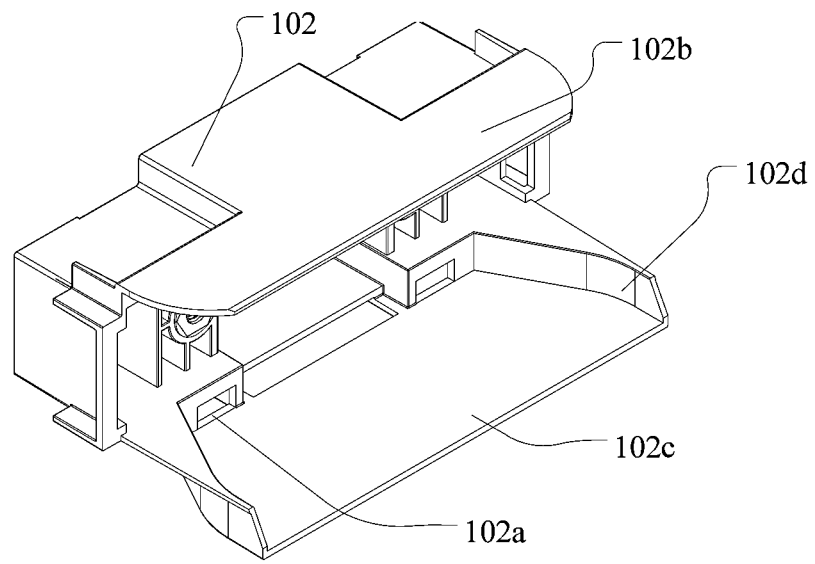
FIG. 5 is a structural schematic view showing a fuse base according to the present application.
Figure 6:
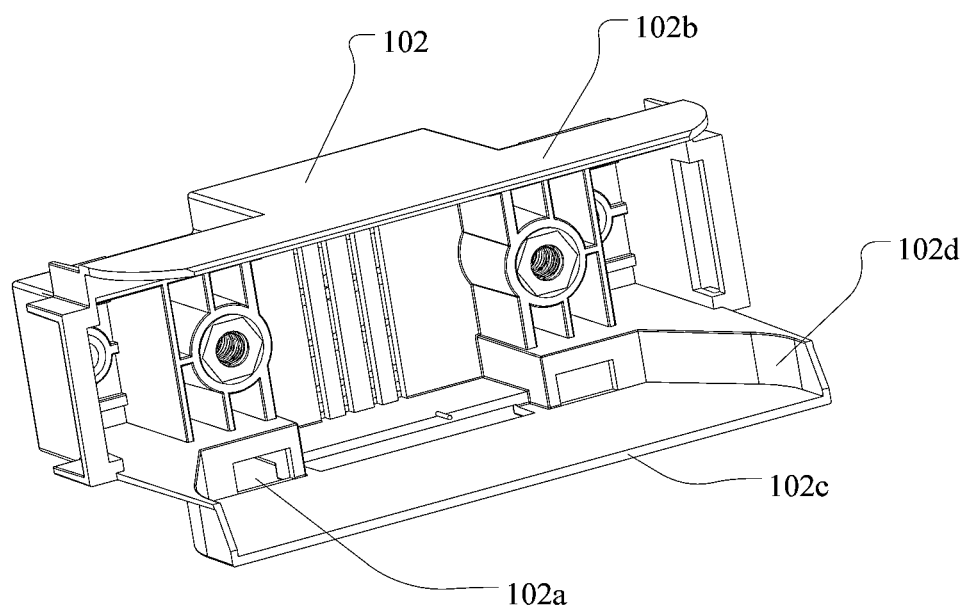
FIG. 6 is a structural schematic view of the fuse base in FIG. 5 from another perspective view.

It can be understood that, the distance between the base side walls 102d on both sides of the fuse base 102 can be gradually reduced as follows: either base side wall 102d is inclined relative to the other base side wall 102d, or both base side walls 102d are inclined, as shown in FIG. 5 and FIG. 6.

The top guide portion 103b is arranged at the top of the drawer 101 for sliding fit with the base top wall 102b of the fuse base 102, and a distance from the base top wall 102b to the base bottom wall 102c of the fuse base 102 is gradually reduced, which facilitates the vertical alignment of the drawer 101 when it enters the fuse base 102.

The bottom guide portion 103*c* is provided at the bottom end of the drawer 101, and is used to be in a sliding fit with the base bottom wall 102*c* of the fuse base 102.

It should be noted that the guide device 103 is not limited to the above structure, but may have other structures. For example, the guide device 103 may include a slide rail provided on the drawer 101 or a slide groove provided on the drawer 101; correspondingly, the fuse base 102 is provided with a slide groove which is in sliding fit with the slide rail or a slide rail which is in sliding fit with the slide groove.

Figure 4:
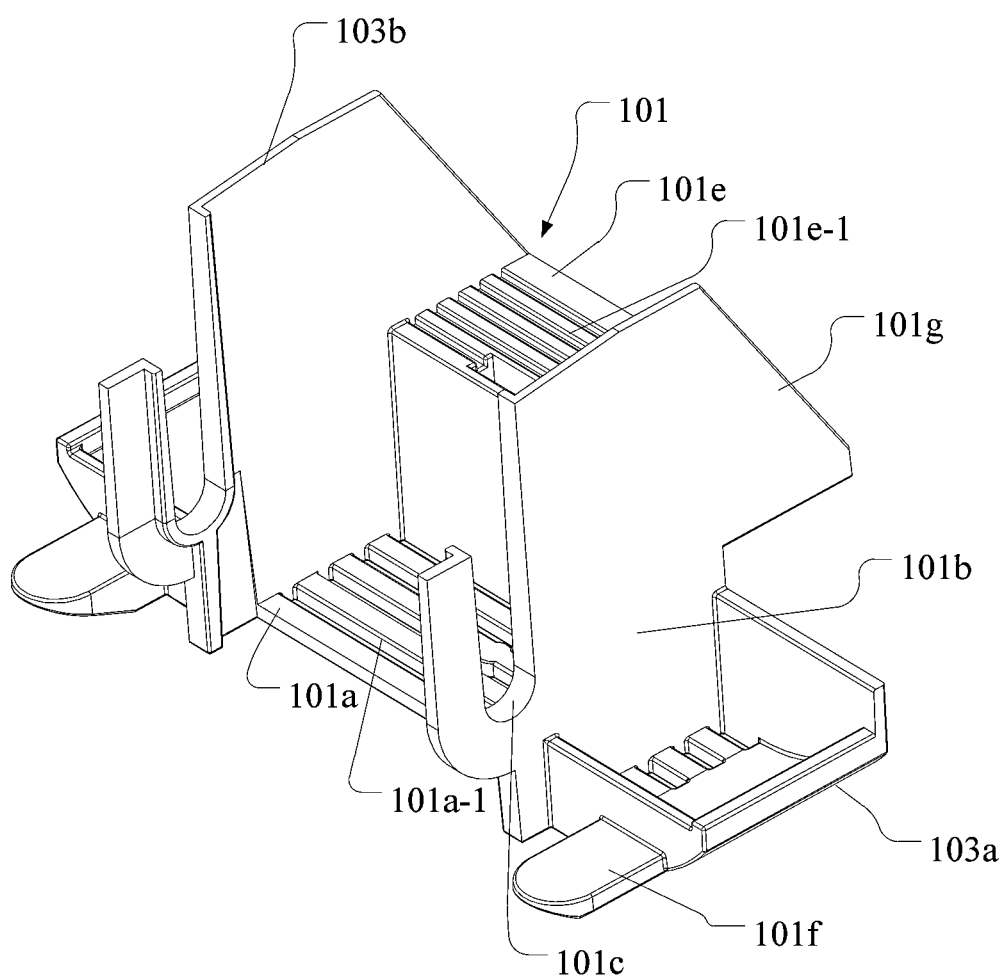
FIG. 4 is a structural schematic view of the fuse in FIG. 3 from another perspective view.

In some embodiments, as shown in FIG. 4, the drawer 101 includes a bottom plate 101*a* and support plates 101*b*, the bottom plate 101*a* is used to support the bottom end of the fuse 200, and the support plates 101*b* are respectively arranged on both sides of the bottom plate 101*a*.

Specifically, the number of support plates 101*b* is two, and the support plates are vertically connected to the bottom plate 101*a* at a certain distance. It should be noted that the number of support plates 101*b* is two, which is only one specific embodiment of the present application. In practical application, the number of support plates 101*b* may be three or more. The top guide portion 103*b* of the drawer 101 is the top surface of the support plate 101*b*.

In this embodiment, the number of support plates 101*b* is two is taken as an example, the distance between the two support plates 101*b* should be enough to accommodate the fuse 200, and the electrical connection groove 201*a* of the fuse 200 for wiring should be prevented from being located between the support plates 101*b*.

The support plates 101*b* are each provided with a hanging groove 101*c*, for supporting the electrical connection portions 201 on both sides of the fuse 200, and the electrical connection groove 201*a*, configured for wiring, of the electrical connection portion 201, is located outside the hanging groove 101*c*, to facilitate wiring.

When the fuse 200 is to be mounted into the drawer 101, it is only necessary to place the fuse 200 on the bottom plate 101*a*, and place the electrical connection portion 201 of the fuse 200 on the hanging groove 101*c*; when the fuse 200 needs to be taken out, it is only necessary to take the fuse 200 out of the drawer 101. That is, the drawer 101 is an open-type structure, which is convenient for taking and placing the fuse 200.

The surface of the bottom plate 101*a* used for supporting the fuse 200 is provided with a heat dissipation protrusion 101*a*-1 and/or a heat dissipation groove and/or a heat dissipation through hole. Specifically, the heat dissipation protrusion 101*a*-1 may be a strip-shaped protrusion, or multiple protruding dots or protruding blocks. The heat dissipation groove is a strip-shaped groove or a pit, and the heat dissipation through hole is a round through hole or a square through hole.

Figure 7:
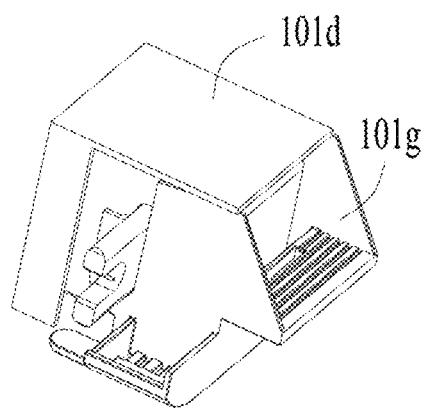
FIG. 7 is a structural schematic view showing a fuse being mounted on a drawer according to another embodiment of the present application.

In some embodiments, as shown in FIG. 7, the drawer 101 further includes a blocking plate 101*d*, the blocking plate 101*d* is connected with the support plate 101*b*, and covers and blocks the fuse 200, that is, the drawer 101 has a closed structure.

Specifically, the structure of the blocking plate 101*d* is not limited, and it may be of any shape. For example, L-shaped plate, U-shaped plate or arc-shaped plate, etc. The structure that can encapsulate the fuse 200 belongs to the protection scope of the present application.

Furthermore, the present application discloses that the blocking plate 101*d* and the support plate 101*b* may be connected by bolts, adhesive bonding, pouring sealant or buckles. It is understandable that the above connection relationship between the blocking plate 101*d* and the support plate 101*b* is only the specific embodiment of the present application, in practical application, the blocking plate 101*d* and the support plate 101*b* may be set in other connection relationships.

In some embodiments, as shown in FIG. 3 and FIG. 4, the drawer 101 further includes a finger pressing plate 101*e*, the finger pressing plate 101*e* is arranged between the support plates 101*b*, and is located at an end of the support plate 101*b* away from the hanging groove 101*c*. On one hand, the finger pressing plate 101*e* is convenient for the operator to hold, on the other hand, it separates the electrical connection portions 201 on both sides of the fuse 200, and avoids the situation that two hands of the operator simultaneously contact the electrical connection portions 201 on both sides of the fuse 200.

To improve the bending strength of the finger pressing plate 101*e*, the present application discloses that both sides of the finger pressing plate 101*e* are respectively connected with a pulling piece 101*g*, the pulling piece 101*g* is connected with the support plate 101*b* on the corresponding side, it should be noted that the structure of the pulling piece 101*g* is not limited, and it can be any structure. In order to facilitate processing and manufacturing, the present application discloses that the pulling piece 101*g* is an inclined plate integrally formed with the support plate 101*b*. It should be noted that, a support rod, a support plate 101*b* or the like connected to the bottom plate 101*a* may also be provided at the bottom end of the finger pressing plate 101*e*.

Specifically, the drawer 101 further includes a connecting plate, one end of the connecting plate is connected to the bottom plate 101*a*, and the other end of the connecting plate supports and connects the finger pressing plate 101*e*, which improves the support strength of the finger pressing plate 101*e*. The connecting plate is connected to the end of the support plate 101*b* near the finger pressing plate 101*e*, to limit the fuse 200.

Further, the finger pressing plate 101*e* is provided with an anti-slip protrusion 101*e*-1 and/or an anti-slip groove and/or an anti-slip through hole.

Specifically, the anti-slip protrusion 101*e*-1 may be a strip-shaped protrusion, or multiple protruding dots or protruding blocks. The anti-slip dissipation groove is a strip-shaped groove or a pit, and the anti-slip dissipation through hole is a round through hole or a square through hole.

In other embodiments, the drawer 101 further includes a pull ring provided between the support plates 101*b* and allowing fingers to extend in, and the pull ring is located at the end of the support plate 101*b* away from the hanging groove 101*c*, so that the drawer 101 can be conveniently pulled by the pull ring. That is, the finger pressing plate 101*e* can be replaced by the pull ring, and two ends of the pull ring can be connected with the support plates 101*b* on both sides respectively. Specifically, the pull ring can accommodate at least one finger to pass through, so as to be pulled.

Figure 10:
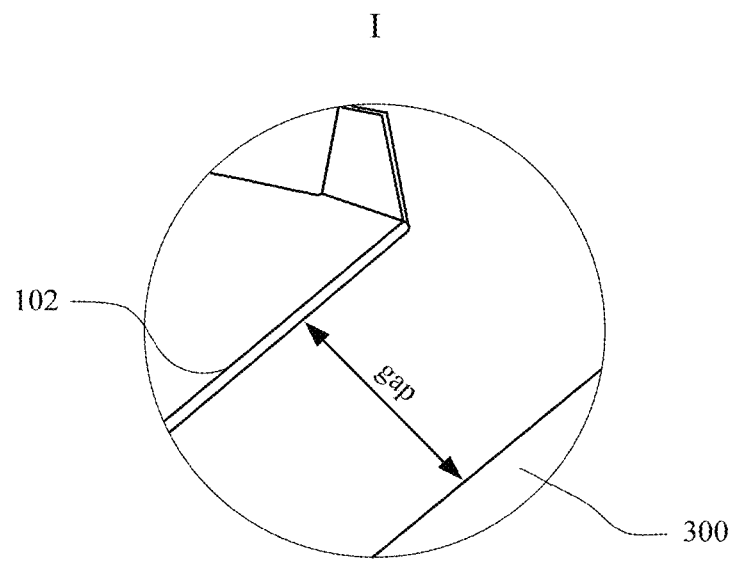
FIG. 10 is a partially enlarged view of FIG. 9.

In some embodiments, the distance between at least one of the base bottom wall 102*c* and the base top wall 102*b* of the fuse base 102 and a maintenance panel of the battery box 300 is smaller than a preset gap, as shown in FIG. 8 and FIG. 10.

It should be noted that, the preset gap is less than or equal to the gap value that allows a bolt, nuts, flat washers or elastic washers to pass through. Specifically, the embodiment discloses that the distance between at least one of the base bottom wall 102c or the base top wall 102b of the fuse base 102 and the maintenance panel of the battery box 300 is 5 mm.

In some embodiments, one of the fuse base 102 and the drawer 101 is provided with a plug-in hole 102a, and the other one of the fuse base and the drawer is provided with a plug-in protrusion 101f which is inserted in and matches the plug-in hole 102a.

Taking a solution that the plug-in protrusion 101f is provided on the drawer 101 and the plug-in hole 102a is provided on the fuse base 102 as an example, as shown in FIG. 1, the number of plug-in protrusions 101f and plug-in holes 102a is equal, and they are arranged in one-to-one correspondence, both of which are two.

Further, along the direction of entering the plug-in hole 102a, the bottom end face of the plug-in protrusion 101f is inclined toward the top end face, which is convenient for guiding. Specifically, the bottom guide portion 103c is the bottom surface of the plug-in protrusion 101f.

The present application has the following advantages:
(1) a drawer type mounting structure is adopted, which is easy to disassemble, thereby reducing the mounting and maintenance time;
(2) the arrangement of the guide device 103 avoids manual alignment, which reduces the mounting and maintenance time;
(3) the arrangement of the finger pressing plate 101e avoids the risk of personal injury caused by operator's accidental touch;
(4) the distance between at least one of the base bottom wall 102c and the base top wall 102b of the fuse base 102 and the maintenance panel of the battery box 300 is smaller than the preset gap, thereby preventing bolts, nuts, flat washers or elastic gaskets from falling into the battery box 300, and thereby improving safety.

A battery system is disclosed according to a second aspect of the present application, including a battery box 300 and a fuse mounting structure 100 according to any one of the above embodiments, the fuse mounting structure 100 is mounted in the battery box 300.

As the battery system provided by the present application includes the fuse mounting structure 100 of any one of the above embodiments, the beneficial effects of the fuse mounting structure 100 are included in the battery system disclosed by the present application.

It should be noted that the words indicating the orientation in this specification, such as the left, right, top, bottom etc., are all set in the direction of FIG. 1, which are only for the convenience of description and do not have other specific meanings.

The above embodiments are described in a progressive manner, each of the embodiments is mainly focused on describing its differences from other embodiments, and reference may be made among these embodiments with respect to the same or similar parts.

With the above descriptions of the disclosed embodiments, those skilled in the art can implement or practice the present application. Various modifications to the embodiments are apparent to those skilled in the art, and the general principle herein can be implemented in other embodiments without departing from the scope of the present application. Therefore, the present application is not limited to the embodiments described herein, but should be in accordance with the broadest scope consistent with the principle and novel features disclosed herein.

In the description of this specification, description with reference to the terms "one embodiment", "example", "specific example", etc. means that specific features, structures, materials or characteristics described in connection with this embodiment or example are included in at least one embodiment or example of the present application. In this specification, the schematic expressions of the above terms do not necessarily refer to the same embodiments or examples. Furthermore, the specific features, structures, materials or characteristics described may be combined in any one or more embodiments or examples in a suitable manner.

The preferred embodiments of the present application disclosed above are only used to help illustration of the present application. The preferred embodiments do not describe all the details, and are not intended to limit the present application to the specific embodiments. Apparently, numerous modifications and variations may be made based on the content of the specification. The embodiments are selected and described in the specification to explain the principle and practical applications of the present application well, so that those skilled in the art can better understand and make good use of the present application. The present application is limited only by the claims and the full scope and equivalents thereof.

The invention claimed is:

1. A fuse mounting structure for mounting a fuse to a battery box, comprising a drawer and a fuse base; wherein
the fuse base is configured to be mounted in the battery box, and the drawer is used for mounting the fuse;
the drawer is provided with a guide device in a sliding fit with the fuse base, to guide the drawer to be inserted into the fuse base; wherein
the guide device comprises side wall guide members, a top guide portion and a bottom guide portion; wherein
the side wall guide members are arranged on both sides of the drawer, respectively, and are in a sliding fit with base side walls located on both sides of the fuse base;
the top guide portion is arranged at a top of the drawer and is configured to be in a sliding fit with a base top wall of the fuse base;
the bottom guide portion is arranged at a bottom of the drawer and is configured to be in a sliding fit with a base bottom wall of the fuse base; and
along a direction of the drawer entering the fuse base, a distance between the base side walls located on both sides of the fuse base is gradually reduced.

2. The fuse mounting structure according to claim 1, wherein the drawer comprises:
a bottom plate for supporting the fuse; and
support plates respectively arranged at both sides of the bottom plate, wherein each of the support plates is provided with a hanging groove for supporting an electrical connection portion located at each of both sides of the fuse, and an electrical connection groove, configured for wiring, of the electrical connection portion is located outside the hanging groove.

3. The fuse mounting structure according to claim 2, wherein the drawer further comprises a blocking plate, the blocking plate is connected with the support plate and is configured to cover the fuse.

4. The fuse mounting structure according to claim 3, wherein the blocking plate and the support plate are connected by bolts, adhesive bonding, pouring sealant or buckles.

5. The fuse mounting structure according to claim 2, wherein
the drawer further comprises a finger pressing plate, the finger pressing plate is arranged between the support plates, and is located at an end of the support plate away from the hanging groove; or, the drawer further comprises a pull ring which is arranged between the support plates and allows fingers to extend in, and the pull ring is located at an end of the support plate away from the hanging groove.

6. The fuse mounting structure according to claim 5, wherein the finger pressing plate is provided with an anti-slip protrusion and/or an anti-slip groove and/or an anti-slip through hole; and/or, a surface, used for supporting the fuse, of the bottom plate is provided with a heat dissipation protrusion and/or a heat dissipation groove and/or a heat dissipation through hole.

7. The fuse mounting structure according to claim 1, wherein a distance between at least one of the base bottom wall and the base top wall of the fuse base and a maintenance panel of the battery box is smaller than a preset gap.

8. The fuse mounting structure according to claim 1, wherein one of the fuse base and the drawer is provided with a plug-in hole, and the other one of the fuse base and the drawer is provided with a plug-in protrusion which is inserted and matches the plug-in hole.

9. The fuse mounting structure according to claim 8, wherein along a direction of entering the plug-in hole, a bottom end face of the plug-in protrusion is arranged to be inclined toward a top end face thereof.

10. A battery system, comprising a battery box and the fuse mounting structure according to claim 1, wherein the fuse mounting structure is mounted in the battery box.

* * * * *